J. M. COLWELL.
INTERNAL COMBUSTION ENGINE.
APPLICATION FILED FEB. 9, 1912.
1,051,690.
Patented Jan. 28, 1913.
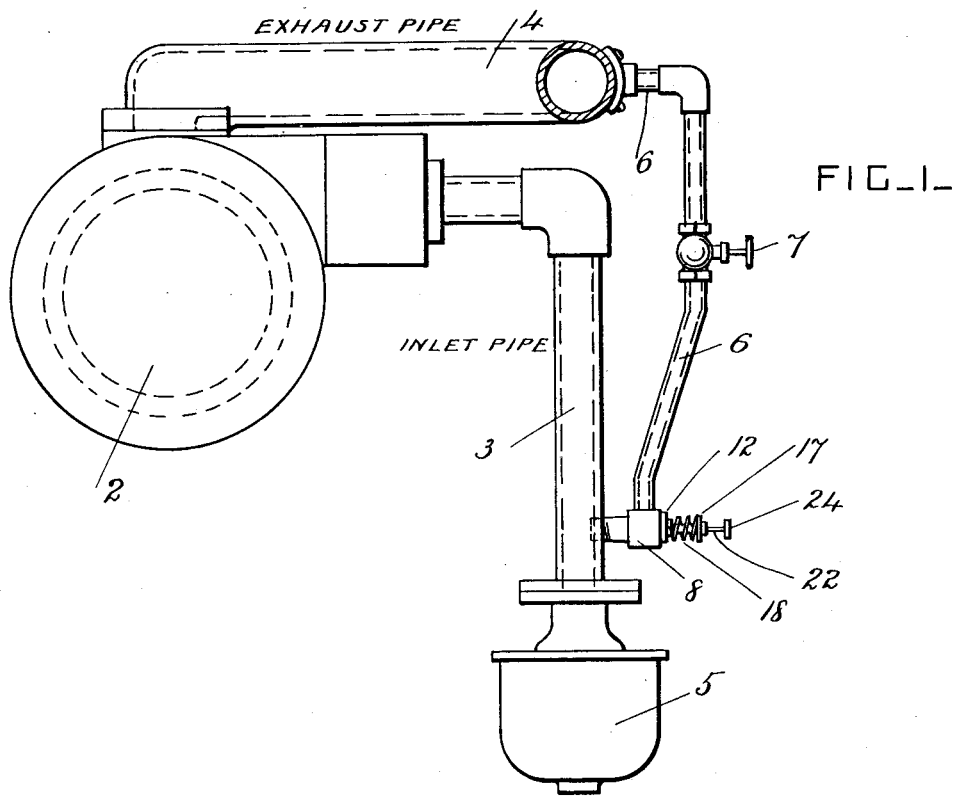
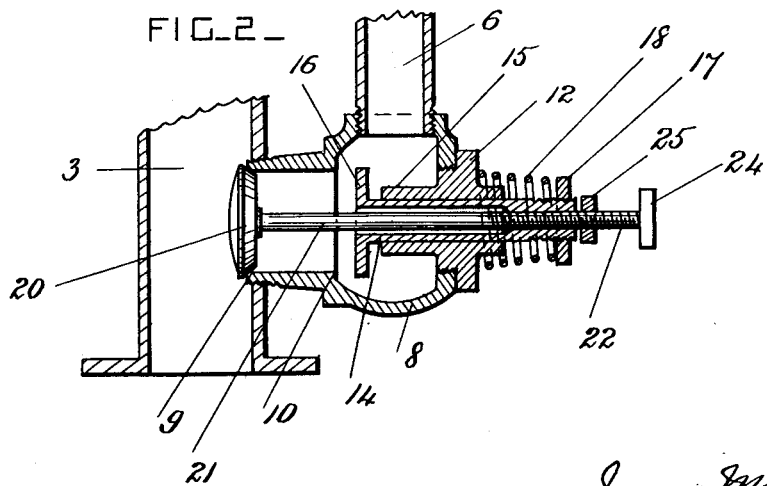
Witnesses
C. P. Fiske.
Wm H. Bates
Inventor
James M. Colwell
Herbert W. Jenner.
By
Attorney

UNITED STATES PATENT OFFICE.

JAMES M. COLWELL, OF TERRE HAUTE, INDIANA.

INTERNAL-COMBUSTION ENGINE.

1,051,690.  Specification of Letters Patent.  Patented Jan. 28, 1913.

Application filed February 9, 1912. Serial No. 676,542.

*To all whom it may concern:*

Be it known that I, JAMES M. COLWELL, a citizen of the United States, residing at Terre Haute, in the county of Vigo and State of Indiana, have invented certain new and useful Improvements in Internal-Combustion Engines; and I do hereby declare the following to be a full, clear, and exact description of the invention, such as will enable others skilled in the art to which it appertains to make and use the same.

This invention relates to internal combustion engines the cylinders of which are supplied with gaseous fuel and air; and it consists in the novel construction and combination of the parts hereinafter fully described and claimed, whereby portions of the hot air and products of combustion from the exhaust pipe are admitted to the inlet pipe, a saving in fuel being thereby effected.

In the drawings, Figure 1 is a side view of portions of the cylinder of an internal combustion engine showing its inlet and exhaust pipes provided with attachments according to this invention. Fig. 2 is a longitudinal section through the casing of the automatic valves, drawn to a larger scale.

The engine is provided with a cylinder 2 of any approved construction, such as used on gasolene motor cars, and this cylinder is provided with an inlet pipe 3 and an exhaust pipe 4. A carbureter 5 of any approved construction is connected to the inlet pipe 3, and air and gasolene vapor are drawn through the inlet pipe into the cylinder in the usual way. A by-pass pipe 6 for hot air is secured at one end to the exhaust pipe 4, and is provided with a hand-operated regulating-valve 7, of any approved make, and any convenient point of its length. A valve casing 8 is secured to the inlet pipe 3 and to the other end of the hot air pipe 6. The valve casing 8 has a valve seat 9 at the end of it which projects slightly within the inlet pipe 3, and it has a second valve seat 10 between the seat 9 and its point of connection with the by-pass pipe 6. The valve casing has a cover plate 12 secured to the other end of it from the valve seat 9, and affording access to its interior.

A sleeve 14 is arranged to slide longitudinally in a tubular guide 15 formed on the cover plate, and this sleeve has on its inner end a retarding valve or retarding plate 16 which works in connection with the valve seat 10. An adjustable nut or collar 17 is screwed on the outer end portion of the sleeve 14, and 18 is a helical spring arranged between the nut 17 and the cover plate, and operating to normally hold the retarding valve clear of the valve seat 10 and in the path of the hot air from the end of the by-pass pipe 6.

A hot air inlet valve 20 is provided, and works in connection with the valve seat 9. The valve 20 is secured on a valve spindle 21 which is provided with a screwthreaded portion 22 which engages with a screwthreaded hole in the sleeve 14. A handle or finger-piece 24 is secured on the projecting end of the valve spindle 21, and 25 is a jam nut also screwed on the valve spindle and operating to lock it to the sleeve. The sleeve 14 is arranged to slide freely in its guide, and both valves slide back and forth with it. The amount of the opening between the retarding valve 16 and its seat is regulated by means of the screwthreaded spindle 21 and its jam nut; and the opening of the inlet valve 20 is regulated by means of the helical spring and its adjusting nut 17.

A portion of the hot air and the products of combustion is forced from the exhaust pipe down the pipe 6 at each exhaust of the cylinder. This rush of hot air opens the inlet valve 20 automatically, passing from the pipe 6 between the retarding valve and its seat, and through the passage in the valve seat 9 into the inlet pipe. The hot air acts beneficially on the combustible mixture in the inlet pipe, probably by heating it and by more thoroughly mixing its constituents, and by converting into gas or vapor particles of liquid fuel which have been drawn through the carbureter, and possibly in some other manner not at present fully understood.

The retarding valve or retarding plate is adjusted so that it does not usually close upon its seat, but when there is an unusual pressure in the exhaust pipe it closes automatically, so that the supply of hot air through the inlet valve 20 is cut off and limited.

What I claim is:

1. In an internal combustion engine, the combination, with a cylinder provided with an exhaust passage and an inlet passage, of a by-pass pipe connecting the said passages, and a valve operated by the pressure of the exhaust and controlling the injection of exhaust fluid through the by-pass pipe.

2. In an internal combustion engine, the combination, with a cylinder provided with an exhaust passage and an inlet passage, of a by-pass pipe connecting the said passages, and a valve arranged at the point of junction of the by-pass pipe with the inlet passage, said valve being operated by the pressure of the exhaust and controlling the injection of exhaust fluid into the inlet passage.

3. In an internal combustion engine, the combination, with a cylinder provided with an exhaust pipe and an inlet pipe for air and fuel, of a by-pass pipe connecting the said pipes, a valve casing secured between the said inlet pipe and by-pass pipe, an inlet valve and a retarding valve secured together and controlling the passage through the said casing, and a spring normally holding the inlet valve closed and the retarding valve open.

4. In an internal combustion engine, the combination, with a cylinder provided with an exhaust pipe and an inlet pipe for air and fuel, of a by-pass pipe connecting the said pipes, a valve casing secured between the said inlet pipe and by-pass pipe, an inlet valve and a retarding valve adjustably secured together and controlling the passage through the said casing and provided with a slidable portion which projects from the casing, and a spring arranged outside the casing and connected to the said slidable portion and normally holding the inlet valve closed and the retarding valve open.

5. In an internal combustion engine, the combination, with a cylinder provided with an exhaust pipe and an inlet pipe for air and fuel, of a by-pass pipe connecting the said pipes, a valve casing secured between the said inlet pipe and by-pass pipe and provided with a guide, a sleeve slidable in the said guide and having a retarding valve on one end portion inside the casing, an inlet valve controlling the outlet from the said casing and provided with a spindle which is secured to and which projects through the said sleeve, a collar on the outer end portion of the said sleeve, and a spring arranged between the said collar and the casing and normally holding the inlet valve closed and the retarding valve open.

In testimony whereof I have affixed my signature in the presence of two witnesses.

JAMES M. COLWELL.

Witnesses:
R. VOORHEES NEWTON,
CLYDE W. ANDREWS.